United States Patent

[11] 3,621,210

[72] Inventors Terry D. Canning
Marion;
Richard L. Jaycox, Cedar Rapids, both of Iowa
[21] Appl. No. 882,579
[22] Filed Dec. 5, 1969
[45] Patented Nov. 16, 1971
[73] Assignee Collins Radio Company
Cedar Rapids, Iowa

[54] COMBINED PERFORMANCE AND COMMAND INDICATOR
12 Claims, 13 Drawing Figs.
[52] U.S. Cl. .................................................. 235/150.2,
340/27, 73/178, 116/129
[51] Int. Cl. ..................................................... G08g 5/04
[50] Field of Search........................................... 340/27, 324
R, 378; 73/178; 235/150.2; 116/129 E, 129 G, 129
H, 129 K, 114 A, 114 J, 116; 244/17.13, 17.11,
17.17

[56] References Cited
UNITED STATES PATENTS
3,277,484 10/1966 Bostwick...................... 73/178 X
3,381,656 5/1968 Ohnikian et al. ............. 340/27 X

*Primary Examiner*—Eugene G. Botz
*Assistant Examiner*—Edward J. Wise
*Attorneys*—Richard W. Anderson and Robert J. Crawford ABSTRACT: Visual annunciation of predetermined scale segments of a performance indicator of the type comprising a zero or reference index and performance indications either side of the reference is utilized to combine a dynamic visual command indication with a performance monitoring indication. Annunciation may be in the form of visual optical stimuli initiated at the extreme performance indices and caused to extend in length in juxtaposition with the scale towards and beyond the reference index to define command limits in terms of performance either side of the index. The command may be easily followed by the observer by control actions to keep the monitored performance out of the annunciated areas. A combined aircraft vertical speed and collision avoidance command indicator is exemplified.

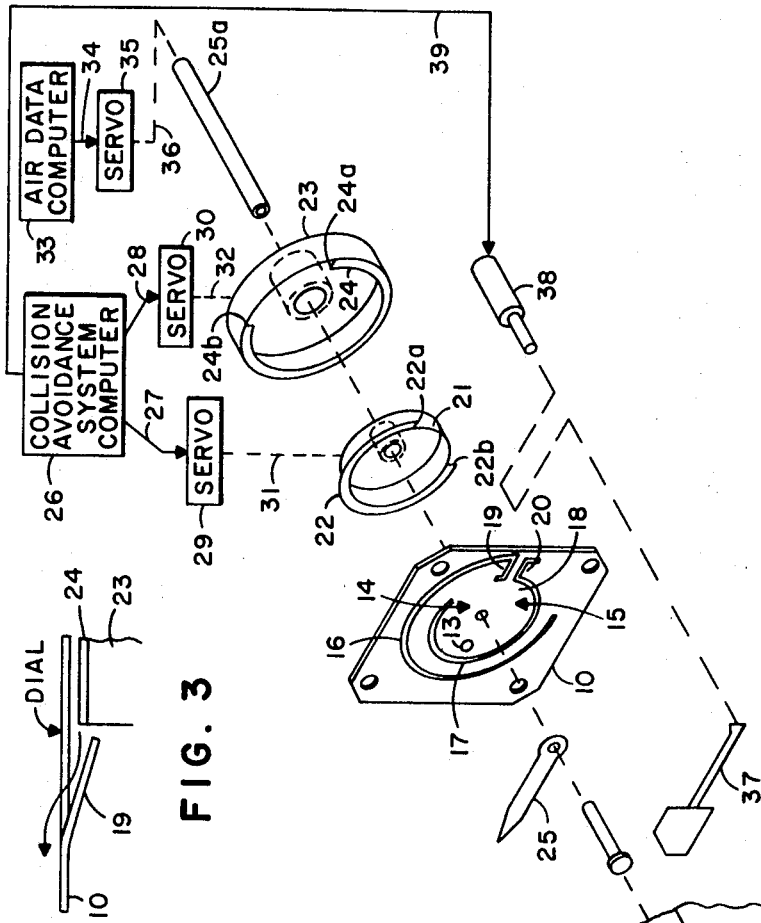
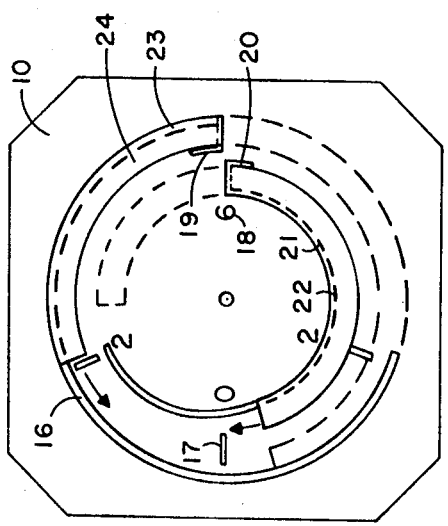
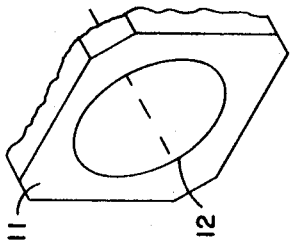
FIG. 1
FIG. 3
FIG. 2
INVENTORS.
TERRY D. CANNING
RICHARD L. JAYCOX
BY  R.W. Anderson
AGENT

INVENTORS.
TERRY D. CANNING
RICHARD L. JAKCOX

BY R. W. Anderson
AGENT

COMBINED PERFORMANCE AND COMMAND INDICATOR

This invention relates generally to indicators and more particularly to a type of indicator combining a dynamic visual command arrangement with a normal performance monitoring indication.

In an exemplified embodiment the present invention relates to the combination of a collision avoidance command indication with an aircraft vertical speed indicator. Collision avoidance systems for aircraft currently being developed require a simple indicator which will convey to the pilot collision avoidance command with a minimum of pilot interpretation and decision making time. Further, such indicators must convey to the pilot an instantly interpretable command presented with the least possible confusion to the pilot.

Known solutions to the collision avoidance indication requirements have employed separate collision avoidance system indicators among which are those using message and/or symbol displays which represent various conditions ranging from preparatory cautions to required maneuvers.

One such type of indicator employs individually lighted messages or symbols. Another known type displays messages mechanically by presenting messages one at a time through an aperture in an indicator face.

Further types of indicators include audio alarm signals used singly or in combination with visual means for drawing the pilot's attention to message changes.

The present invention has a primary object the provision of a collision avoidance command indication utilized in conjunction with a standard vertical speed indicator by means of which the pilot may monitor his vertical speed performance in conjunction with an instinctively interpretable command as to vertical speed limitations imposed by collision avoidance computer command inputs.

By displaying collision avoidance system command in conjunction with and, in fact, as an integral part of, an existing vertical speed indicator, the present invention provides the additional benefit of instrument panel space saving.

The present invention is featured in a provision of combining with a conventional vertical speed indicator first and second dynamically controllable visual optical stimuli which respectively function in conjunction with the conventional vertical speed indication as climb-limiting and descent-limiting commands, respectively.

A further feature of the present invention is the provision of an instinctively interpretable command by so displaying collision avoidance commands in conjunction with monitored vertical speed on the conventional instrument that the pilot may instinctively follow the command by keeping the indicator needle "out of the red." As such, the present invention provides a means of definitively annunciating a predetermined segment of the normal vertical speed indicating scale as a portion to be avoided. By flying the aircraft in climb and descent so as to "keep the needle out of the red," the pilot follows the command and obviates collision with an aircraft on a converging flight path.

These and other features and objects of the present invention will become apparent upon reading the following description in conjunction with the accompanying drawings in which:

Fig. 1 is a functional exploded view of a vertical speed indicator including the addition of the climb and descent limiting optical stimuli in accordance with the present invention;

Fig. 2 is a mechanical detail of an instrument dial face in accordance with the present invention;

Fig. 3 is a mechanical detail of a guide means employed in the Fig. 2 arrangement;

Figure 4:
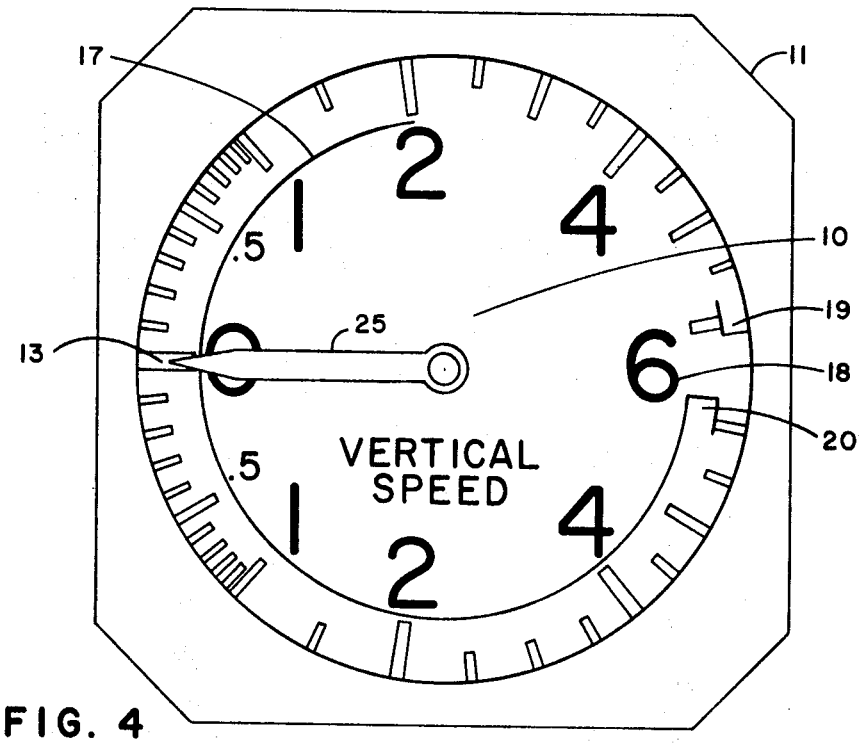
Figs. 4 through 9 represent various visual presentations under various command conditions.

The present invention will be described in terms of a combination aircraft vertical speed and collision avoidance command indication. It is to be understood, however, that in a general sense the present invention resides in combining with an indication comprising a reference index and various condition or performance indices extending either side of the reference index, a means for selectively incorporating dynamic optical stimuli by means of which predetermined portions of the respective indicating sectors either side of the reference index are provided with a visual annunciation adjustable in length and extending on a command basis from the extreme ones of said performance indices towards said reference index. Discrete controllable areas of the indicator scale are thus defined, from which the performance indication is excluded on a command basis under certain conditions. Thus, in a combined vertical speed-collision avoidance command indication, the optical stimuli are selectively adjustable in length from the extreme descent and climb indications towards the zero or reference vertical speed index in response to command signals stemming from a collision avoidance system computer.

It is contemplated that the principle of the present invention may be employed with other monitoring indicators of a type showing a reference indication and deviations "above" and "below" the reference such as engine r.p.m., indicators displaying maximum/minimum mach number for a particular aircraft altitude, and stall speed indicators based on altitude and payload, which types of indications might well be represented by the type of device to be described herein.

As a preferred embodiment of the present invention the proposed indicator takes the form of a combination indicator comprising standard vertical speed monitoring with a dynamic readout device driven by a collision avoidance system. A combination aircraft vertical speed indication and collision avoidance command will be described for both circular and linear indicator dial instruments.

In a general sense the present invention provides means employed in conjunction with a conventional vertical speed indication of visually annunciating predetermined portions of the climb and descent segments of the vertical speed indicator so as to establish, in effect, command limits as to permissible climb and descent maneuvers. Thus by annunciating the entire climb segment of the indication, the command may be instinctively interpreted as "do not climb." Conversely, by annunciating the entire descent segment of the vertical speed scale the command is instinctively interpreted as "do not descent." Actually first and second controllable annunciations are employed in conjunction with respective segments of the indicator scale either side of the reference index, whereby combinations of the two controllable annunciations define operational commands which may impose both descent and climb limits at predetermined vertical speeds. Provision is additionally incorporated where either one of the annunciations may be extended beyond the reference to the other segment to provide discrete commands in the form of "climb with a predetermined minimum vertical speed," or "descend with a predetermined minimum descent rate."

It is to be understood that the command signals which define the areas of annunciation emanate from a collision avoidance system computer. The details of collision avoidance system computation will not be herein described, it being realized that the present state of the art provides numerous computations by means of which collision avoidance command signals may be formulated in terms of permissible or command aircraft descent and climb rates. The present invention is embodied in an indicator system under the control of such systems and the unique manner in which the commands are combined with the vertical speed performance indication to provide an instinctively interpretable dynamic command to the pilot.

With reference to FIG. 1 the invention is embodied basically as the addition of an appropriate optical stimuli to an otherwise conventional vertical speed indicator of the type employing a circular dial. The instrument might thus comprise a housing 11 into which a viewing circle 12 is placed. Immediately behind the housing 11 is a dial plate member 10 carrying a zero or reference index 13 to represent level flight or zero rate of climb. The upper portion 14 of the dial face is comprised of indicia representing increasing rates of climb from the reference 13 to a maximum indication at index 18 which is placed diametrically opposite the reference. The lower portion or segment of the dial face 15 likewise carries increasing indications of negative vertical speed or descent indication, increasing from the reference 13 in a counterclockwise fashion to the maximum indication 18.

As in conventional vertical speed indicator, a pointer or indicator member 25 is employed for readout purposes. The pointer 25 is driven by a rotatable shaft 25a under the influence of a rotational mechanical input 36. The rotational input 36 might stem from a servo 35 under the influence of a signal 34 developed in a conventional air data computer 33. The indicator needle 25 thus is positioned on the zero or reference index 13 on the dial face when the aircraft is experiencing level flight and shows by its relative position with respect to the zero index the descent or ascent rates actually being experienced. The pointer 25 in conjunction with the indicator dial thus monitors aircraft vertical speed.

Immediately behind the dial face or dial plate member 10 a pair of rotatable cylinder members 21 and 23 are mounted so as to be individually selectively rotatable in accordance with command signals emanating from a collision avoidance system computer 26. Reference to FIG. 1 indicates that a first cylindrical member 21 carries on the periphery thereof a transversely extending band member 22 initiating at a point 22a and extending in arcuate fashion about the edge of cylinder 21 to a terminal portion 22b which might for example define a segment of 270°. A second cylindrical member 23 of larger diameter is mounted concentrically with cylinder 21. The cylinder 23 has a transversely extending band member 24 initiating at a point 24a and extending in arcuate fashion to a terminal point 24b. and member 24 might likewise extend over a 270° segment.

In the particular embodiment illustrated in FIG. 1 the band member 22 associated with cylinder 21 extends radially outwardly from the cylinder surface while the band member 24 associated with cylinder 23 extends radially inwardly from the cylinder surface.

The dial plate 10 is formed with a first arcuate slot 16 on a radius substantially equal that of the larger cylinder 23. The slot 16 initiates at a point on the dial plate substantially in the area of the maximum index member 18 and continues in a counterclockwise direction to cover substantially a 270° segment. A second arcuate slot 17 of a smaller diameter corresponding substantially to that of the smaller cylinder 22, is formed in the dial plate 10 so as to extend from an initial point in the vicinity of the maximum index 18 in a clockwise direction over an arcuate segment of approximately 270°. The slots 16 and 17 each communicate with a guide member at their points of initiation. Slot 16 communicates with a guide member 19 at its initial point while slot 17 communicates with guide member 20 at its initial point.

FIGS 2 and 3 illustrate the assembled relationship and cooperation between the slots 16 and 17 formed in the dial plate 10 and the transversely extending band members 22 and 24 carried on rotatable cylinders 21 and 23, respectively. It might first be emphasized that, upon assembled relationship between the cylinders and the dial plate, no part of the transversely extending band members is visible to the viewer when the cylinders are in the positions indicated in FIG. 1. Upon counterclockwise rotation of cylinder 23 the band member 24 carried by cylinder 23 is guided by cooperation with guide member 19 onto the front or viewable surface of the dial plate. The guide member 19 might actually comprise a portion of the dial plate 10 inclined inwardly from the viewed side of the dial as shown in FIG. 3, such that counterclockwise rotation of the cylinder member 23 guides or deflects the transversely extending band member 24 up the guide member 19 and onto the front surface of the dial plate. It is to be understood that both the dial plate and the transversely extending band members would be fashioned of flexible material to permit this cooperation.

With reference to FIG. 2, cylinder 23 is illustrated as being rotated counterclockwise from its FIG. 1 position such that a predetermined portion of the transversely extending band 24 is guided onto the viewable surface of the plate 10. In similar fashion, clockwise rotation of the smaller cylinder 21 guides its transversely extending band member 22 up guide member 20 and onto the viewable surface of the dial plate 10 as illustrated in FIG. 2. It is thus seen that portions of each of the transversely extending band members, which serve as respective dynamically controllable optical stimuli of the invention, are stored out of view behind the dial plate member 10, and a controllable portion, depending upon the degree of rotation of the associated cylinder member, is viewable to the observer. Now, considering that the transversely extending band members 22 and 24 are painted a bright contrasting color as opposed to the dial face, such as, for example, bright red (in contrast to a black dial face), the portion of the band members viewed by the observer is a readily observable optical stimulus and, in accordance with the present invention, the portions of the band members viewed cover predetermined segments of the vertical speed indications and could be interpreted as vertical speed command. The terminal portion of the visible part of band member 23 on the outer dial surface might then establish a limit as to rate of ascent while the terminal or leading end of the visible portion of band member 22 might serve as a commanded descent limit for the relative positions depicted in FIG. 2.

Note that the slot 16, cooperating with band member 24 as positioned by cylinder 23, extends over the entire "climb" segment of the dial indication and beyond the zero or reference index 17 by a predetermined angular segment into the descent segment of the indication. Similarly the slot 17, associated with band member 22 as positioned by cylinder 21, extends beyond the lower segment of the indication by a predetermined angular segment into the upper portion. The significance of this overlap will be further described. The philosophy of the command indication is that the pilot control the aircraft in vertical speed so as to keep the indicator needle 25 "out of the red." The relative positions of the two annunciator bands thereby define areas of the displayed descent and ascent indications which are "red-lined" and where performance is prohibitive for a given situation.

With reference to FIG. 1, the rotation of the two band carrying cylinder members 21 and 23 is effected by command signals emanating from a collision avoidance system computer 26. Thus the computer 26 might derive a first command signal 27 for application to a servo 29, providing a rotational input 31 to the inner cylinder 21 so as to establish a first command limit. The collision avoidance system computer 26 might develop a second command signal 28 for application to a servo 30 to provide a rotational output 32 to the outer cylinder 23 to establish a second command limit.

A further command indicator in the form of a flag member 37 may be mounted for rotation by a rotary solenoid member 38 under the control of a further command signal 39 emanating from the collision avoidance system computer 26. The command indicator 37 might be labeled "do not turn" and thus, when rotated into the pilot's view under the influence of the command signal 39, provide a further command to maintain the present aircraft heading as well as comply with vertical speed command. In the absence of a command signal 39 from the computer 26 the "do not turn" flag 37 would be positioned out of view of the observer. The indicator 37, in conjunction with the band annunciators previously described, would thus provide the pilot an indication on one instrument of aircraft performance as to vertical speed together with a combined indication as to commanded ascent and descent limits and supplemented with an additional annunciation as to permissible changes in present aircraft heading.

The manner in which the above-described instrument is effective in establishing instinctively interpretable commands to the observer will be appreciated by reference to FIGS. 4-9 which indicate performance and command indications in a variety of situations.

FIG. 4 illustrates a condition viewed by the observer under normal level flight conditions with no collision avoidance system commands. Note that the slot 17 which cooperates with band 22 is visible on the face of the dial but not in an annunciated manner. The housing or faceplate 11 obscures the outer slot 17.

Figure 5:
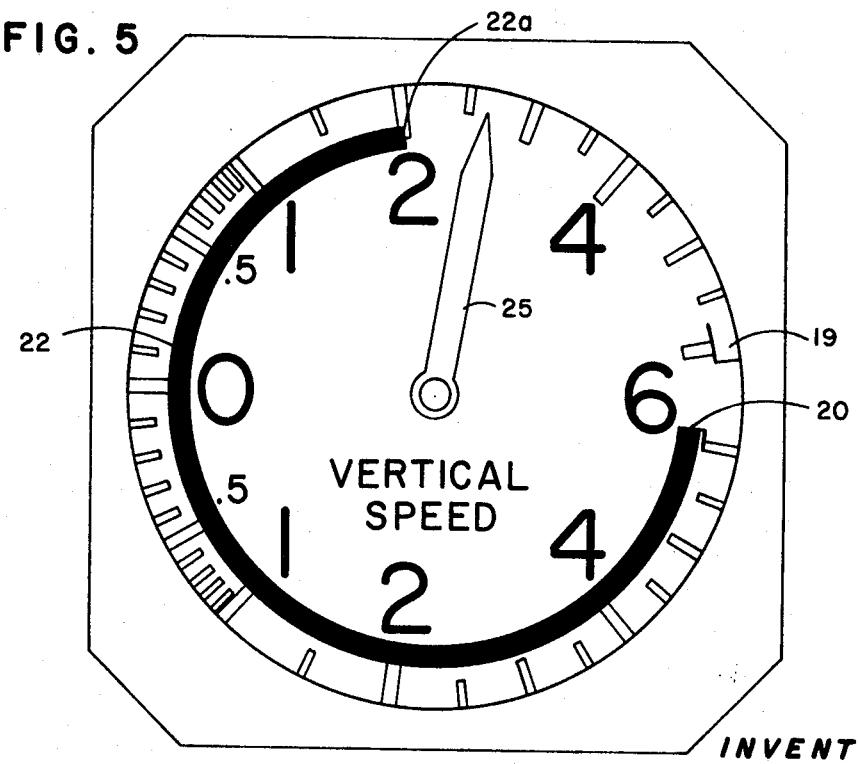

FIG. 5 depicts a 2,700 ft. per minute climb or ascent, in conjunction with a collision avoidance command that the pilot maintain his rate of ascent in excess of the 2,000 ft. per second. The command might likewise be stated as "go up-minimum climb 2,000 ft. per minute." Considering that the band 22 is colored a bright readily discernible color such as red, by keeping the pointer 25 "out of the red" the pilot will maintain a rate of climb to prevent a collision with an intruding aircraft, it being understood that the rotation of the cylinder associated with the band 22 is under the influence of a command signal from a collision avoidance system computer. In FIG. 5 the situation involves only the rotation of the cylinder associated with the band 22 and clearly indicates that no descent rates at all are permitted and that ascent rates less than 2,000 ft. per minute are not permitted. The pilot may easily comply with this command by keeping the pointer 25 "out of the red."

Figure 6:
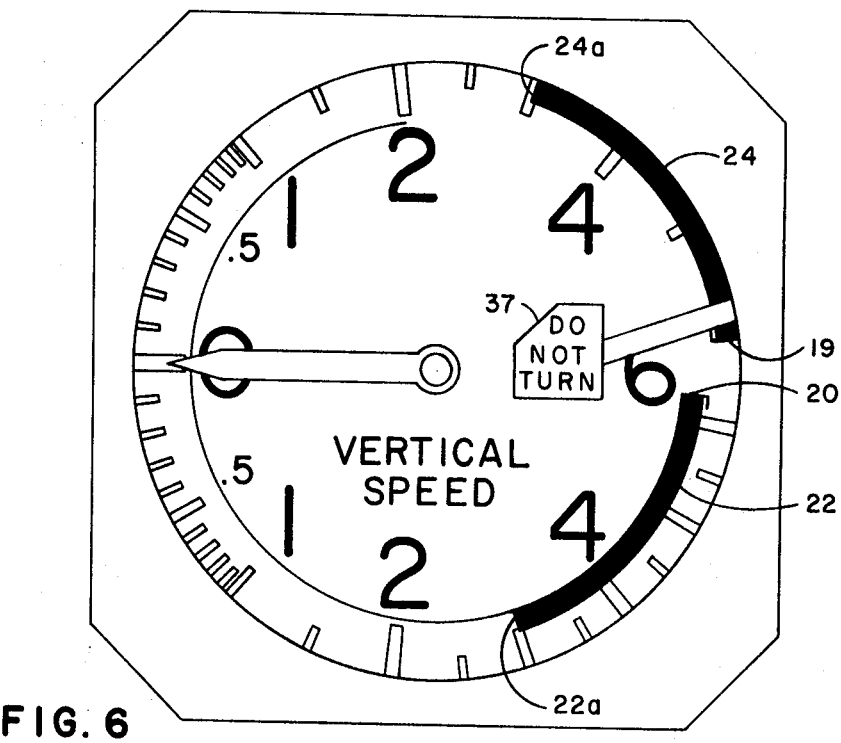

FIG. 6 depicts the aircraft is in level flight and, due to a particular dynamic relationship between the observer's aircraft and that of intruding aircraft, a command is presented not to exceed a climb of 3,000 ft. per minute and not exceed a descent rate of 3,000 ft. per minute. In this situation bands 24 and 22 both come into visible play, annunciating respective portions of the ascent and descent segments of the scale indication from 3,000 ft. per minute indication to the maximum indication. By keeping the pointer "out of the red." the pilot will comply with the command.

FIG. 6 additionally illustrates the "do not turn" flag member 37 in visible position, to further command that no turns be initiated from the present heading of the aircraft.

Figure 7:
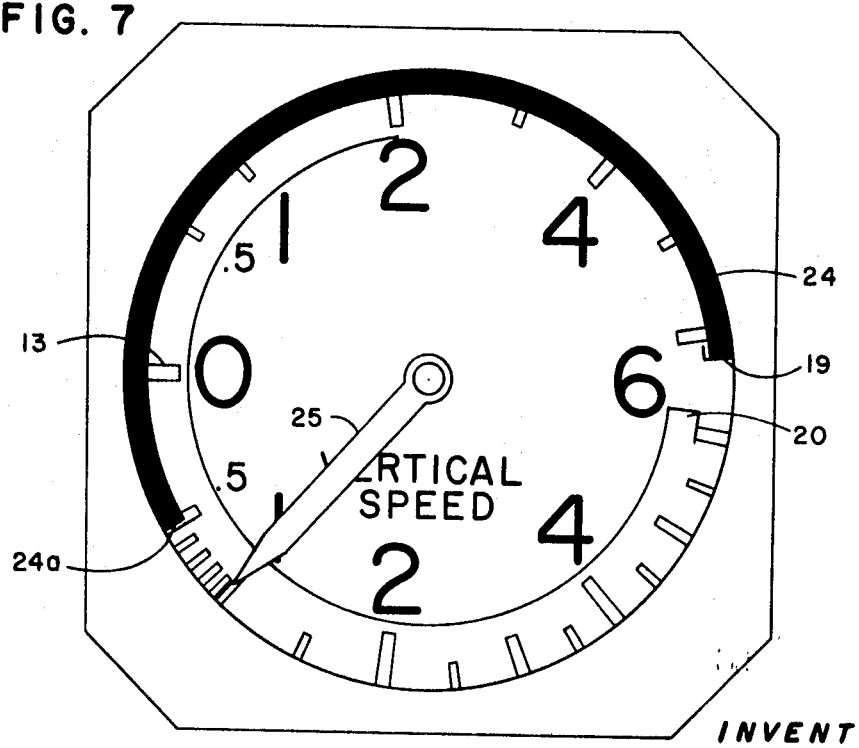

FIG. 7 illustrates a monitored descent rate of 1,000 ft. per minute and a command of "go down-minimum descent-500 ft. per minute" as indicated by the terminal portion 24a of the band 24. In this instance it is seen that the band 24 is rotated into visible position on the face of the dial plate over the entire "climb" portion of the dial and beyond the reference index 13 into the descent portion. Band member 22 remains out of play in stored position.

Figure 8:
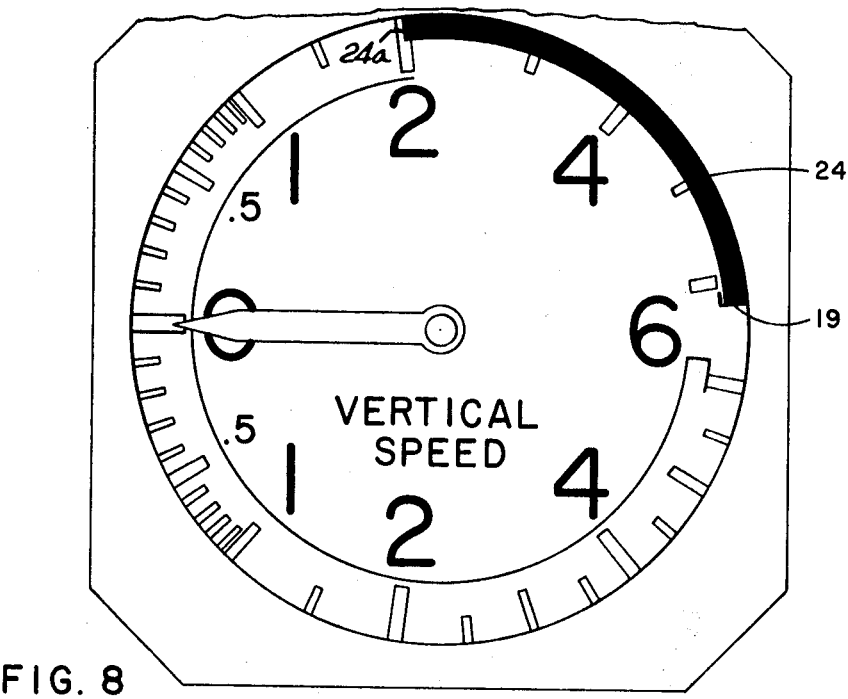

FIG. 8 represents a level flight condition and a command as determined, by the end 24a of tape 24, that a climb rate in excess of 2,000 ft. per minute is to be avoided. The command here is thus "maximum climb-2,000 ft. per minute."

Figure 9:
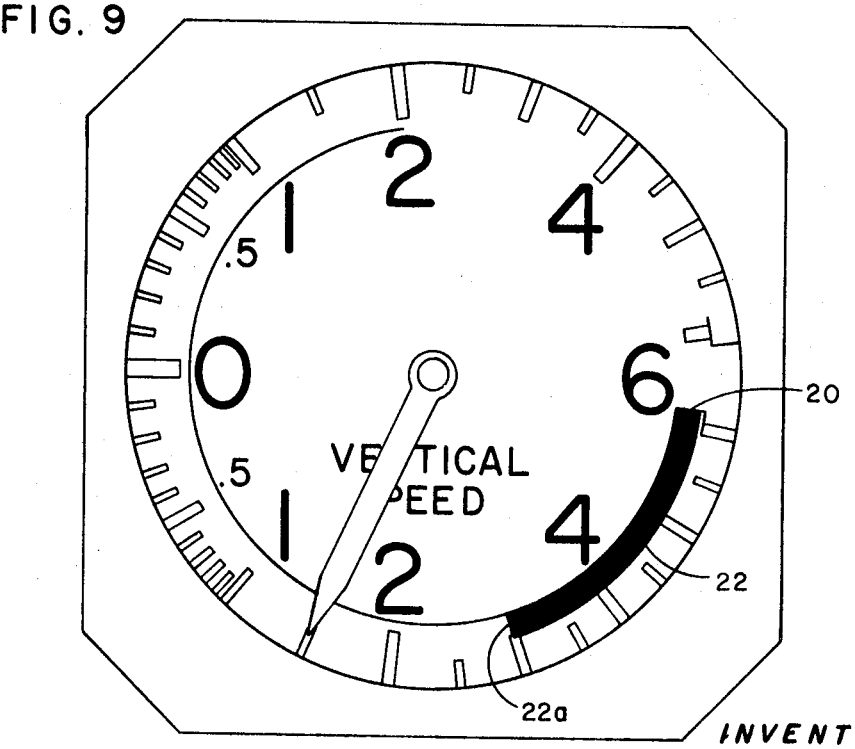

FIG. 9 illustrates a monitored descent rate of 1,500 ft. per minute and a command, as defined by the leading edge 22a of band member 22, that descent rates in excess of 3,000 ft. per minute be avoided. The command here becomes "maximum descent-3,000 ft. per minute."

The interplay of the two annunciating band members 22 and 24 thus establishes various descent and ascent limits, and in some situations, may completely "red-line" all descent rates and establish a predetermined minimum ascent rate, and vice versa. In all situations, the interpretation of the pilot is simplified to "keep the needle out of the red." This command is continuous and dynamic in nature and instinctively interpretable as to both vertical speed control limitations and commanded changes. The "do not turn" flag member 37 completes the avoidance command in the horizontal plane.

In general it is seen that the annunciator band 24 is utilized to establish progressively lesser maximum ascent commands as it proceeds from the maximum index 18 toward the reference index 13, and to establish, as it extends beyond the reference index 13, a minimum descent command over a predetermined range. Conversely, annunciator band 22 establishes progressively lesser maximum descent commands as it progresses from the maximum index 18 toward the reference index 13 in clockwise fashion, and extends beyond the reference index 13 to establish a minimum ascent command over a predetermined range. The operation of the two bands, under the control of appropriate descent and ascent command signals formulated in the collision avoidance computer, is thus seen to be adaptable to cover necessary vertical speed commands for all possible intrusion situations.

The principles embodied in the circular indication described above may be extended to apply in conjunction with indicators employing a linear scale. FIGS. 10-13 illustrate a variety of general implementation schemes whereby visual optical stimuli may be caused to extend from the maximum scale indications toward and beyond the reference index so as to establish ascent and descent command limitations in the same manner as presented by the circular dial embodiment.

Figure 10:
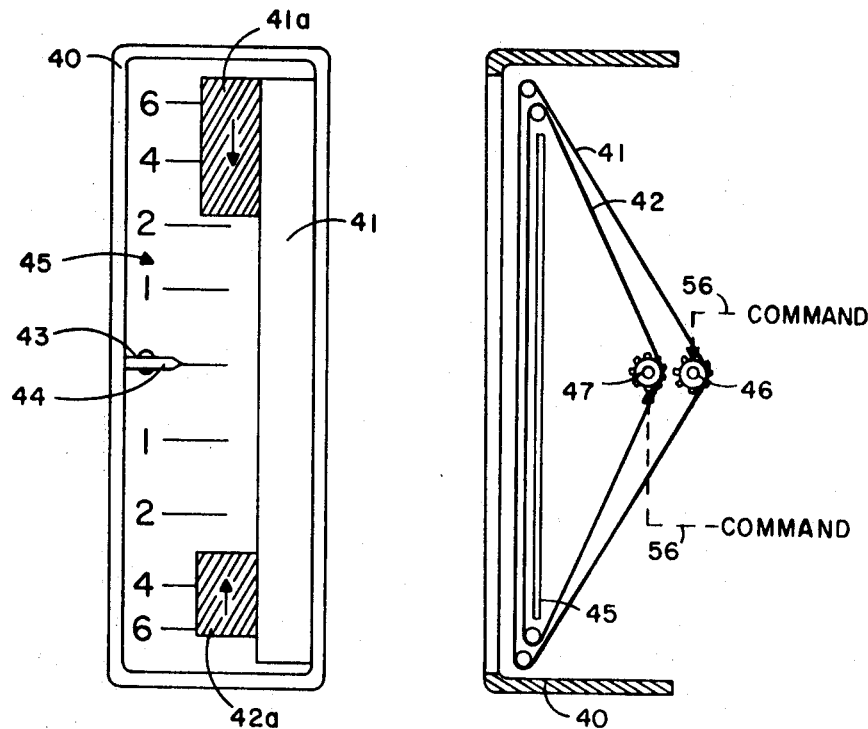
FIGS. 10 through 13 represent various embodiments of a combined instrument in accordance with the present invention wherein a linear scale is employed as opposed to a circular scale.

With reference to FIG. 10, a linear dial vertical speed indicator is illustrated as comprising a face member 40 through which is viewable a linear scale 45 including a reference or zero index 43 from which extend indices illustrating ascent and descent vertical speed conditions. In accordance with the invention, a pair of tapes 41 and 42 may be driven by appropriate sprocket drives 46 and 47 in accordance with command signals 55 and 56 which would emanate from the collision avoidance system computer. The embodiment of FIG. 10 illustrates colinear rotating tape bands wherein each of the tapes is comprised of an enlarged cross section portion such as 41a associated with tape 41 and 42a associated with tape 42. The sections 41a and 42a might be comprised of a highly discernible red coloring while the remainder of the tapes is black to match the dial face coloring. In this manner the portions 41a and 42a may be caused to extend from the extreme indexes at the top and bottom of the instrument toward the zero reference index and by a predetermined amount beyond the reference index to result in an annunciated collision avoidance command similar in interpretation to that described with respect to the circular dial face; namely, that of controlling the aircraft as to vertical speed in such a manner that the indicator needle or movable index 44 is "kept out of the red."

Figure 11:
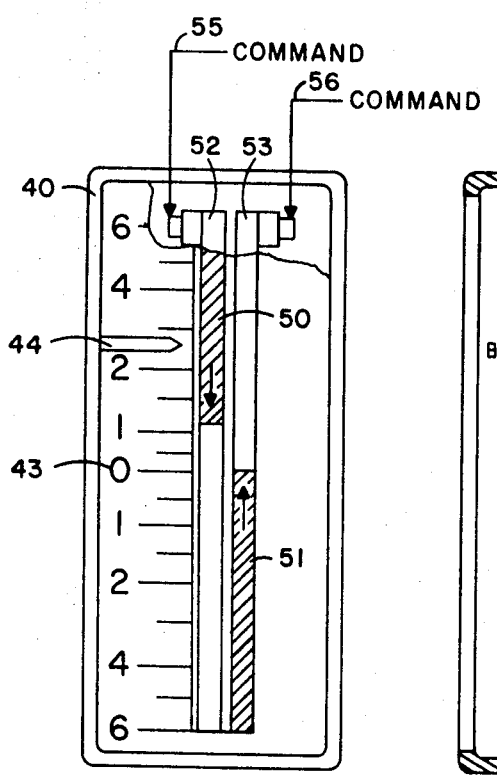

FIG. 11 illustrates a further embodiment combining a dynamic collision avoidance warning with a vertical speed indicator. In this embodiment a pair of parallel rotating bands or tapes, 50 and 51, may be employed. Tape 50 might be driven by a motor means 52 in response to a command 55 from the collision avoidance system computer. Tape 51 might be driven by a motor means 53 in response to a command 56 from the collision avoidance computer. The tapes may carry red coloration so as to define distinct bands and be driven in accordance with the command signals so as to cause the visual or optical stimuli to appear at the extreme indices on the dial face and extend toward and beyond the zero reference indication 43.

Figure 12:
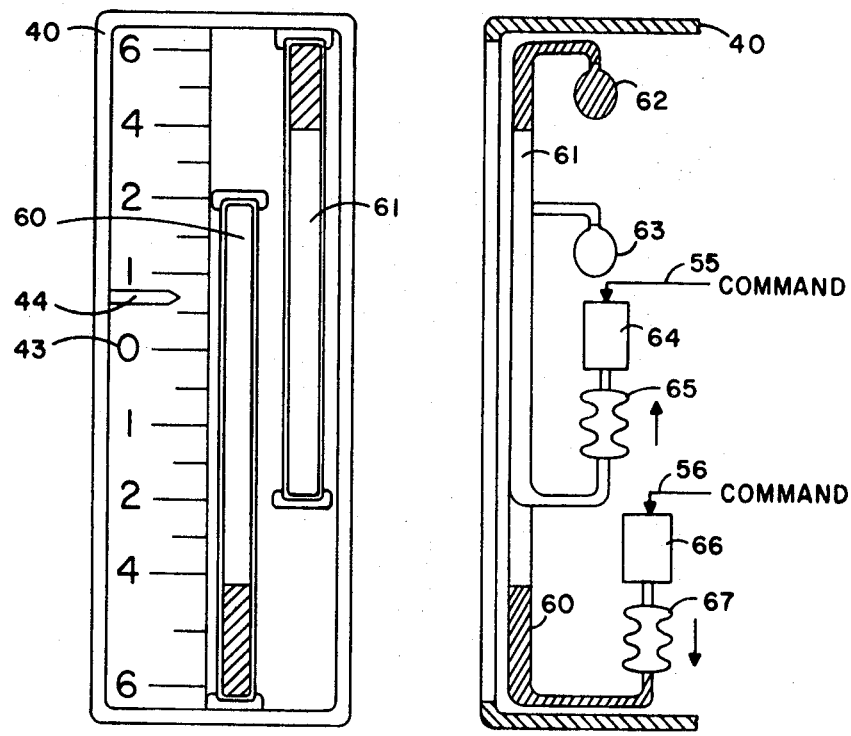

FIG. 12 depicts a pair of parallel-displaced liquid filled tubes 60 and 61 disposed with respect to the dial face. The first tube 61 might terminate at its upper extreme in an expandable storage member 62 and at its lower extreme in a bellows 65 under the control of a solenoid member 64. The solenoid 64, in response to command signals 55 from the collision avoidance system computer, would expand the bellows 65 to draw a red fluid in tube 61 down into viewable position by the observer. A second tube 60 might terminate at its upper end in a further expandable storage member 63 and at its lower extreme with a second bellows 67 under the control of a further solenoid 66. Solenoid 66, in response to command signals 56 from the collision avoidance system computer, would compress the bellows 67 so as to push a red fluid contained in tube 60 upwardly into viewable position. As in the previously described embodiments, the command to the observer is to keep the indicator member 44 "out of the red."

Figure 13:
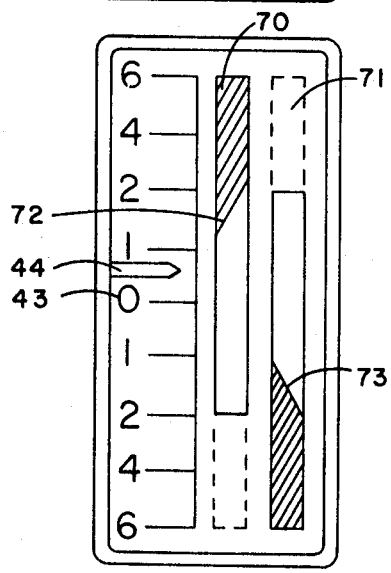

A still further embodiment employing a linear scale is depicted in FIG. 13. A pair of helically striped rotatable cylinders 70 and 71 are deployed in parallel fashion with respect to the dial face. Rotation of cylinder 70, in response to command signal 55 from the collision avoidance system computer, would cause the observable helical band leading edge 72 to move downwardly from the maximum dial index. Similarly the second helically striped cylinder 71 may be rotated in response to command signal 56 from the collision avoidance system computer to cause the leading edge 73 of a brightly colored helical stripe to move upwardly from the lower extreme index on the dial face. Again the command portrayed to the observer is to keep the indicating member 44 "out of the red."

Obviously further visual stimuli might be implemented in accordance with the principle of the invention. Light bands might be employable as well as segmented lighted prism arrangements. Solenoid-actuated annunciator segments might be employed.

The present invention is thus seen to provide a combination performance monitoring the command indication instrument wherein predetermined limits may be established in a command fashion for types of performance indicators showing variations either side of a zero reference index. By causing the stimuli to be extendable over the over and beyond their associated segment of the indication, it is seen that a highly flexible command indication scheme is provided in conjunction with performance monitoring.

Although the present invention has been described with respect to particular embodiments thereof, it is not to be so limited as changes might be made therein which fall within the scope of the present invention as defined in the appended claims.

We claim:

1. In an indicator of the type displaying performance deviation either side of a reference indication and including a reference index from which symmetrically disposed performance indices extend to represent bidirectional deviation from said reference index, first and second dynamically controlled optical stimuli variable in length so as to be juxtapositionable with predetermined controllable segments of the indices either side of said reference index to define respective segments of said indices, said segments extending from the maximum indices either side of said reference index toward said reference index, that portion of said indices juxtaposed with said controllable optical stimuli representing a first command area of said indicator and the remaining portion of said indices representing a second command area of said indicator.

2. An indicator as defined in claim 1 wherein said optical stimuli comprise visible bands initiating from the respective extremes of said performance indices, and being controllable in length to move from the respective extreme indices towards said reference index in response to predetermined command inputs.

3. An indicator as defined in claim 2 wherein each of said bands is selectively adjustable in length as extending from one of said extreme indices and disposed adjacent said performance indices, the length of each said band being controllable from a zero length to a length extending beyond said reference index.

4. An indicator as defined in claim 1 wherein each of said stimuli is selectively adjustable in length as extending from one of said extreme indices and disposed adjacent said performance indices, the length of each said stimuli being controllable from a zero length to a length extending beyond said reference index.

5. An indicator as defined in claim 1 wherein said reference and performance indices are arranged in a linear display, each of said visual stimuli arranged to vary in length from one of the respective extreme ends of said linear display to extend substantially parallel to said indices over the entire range of indices on one side of said reference index and beyond said reference index by a predetermined length.

6. An indicator as defined in claim 1 wherein said reference and performance indices are arranged on a circular dial and including an indicating member rotatable about an axis centrally located on said dial the position of which with respect to said indices represents performance being monitored, said first and second optical stimuli being initiated at a point diametrically opposite said reference index and being extendable in length from said initial point circumferentially about said dial over a predetermined arcuate segment, a first one of said optical stimuli extending clockwise from said initial point toward said reference index and a second one of said optical stimuli extending counterclockwise from said initial point toward said reference index, said first and second stimuli thereby collectively defining a predetermined segment of said indices which in conjunction with the position of said indicating member defines a predetermined command.

7. An indicator as defined in claim 6 wherein said stimuli are extendable over an arcuate segment at least as great as one-half the circumference of said dial.

8. A device as defined in claim 6 wherein said first and second stimuli comprise first and second circumferentially extending band members carried by respective drum members rotatable about an axis coincident with that of said indicator member, said band members extending transversely about a predetermined portion of the circumference of the associated one of said drums, said indicator comprising a dial plate formed with through-slots respectively extending arcuately from points substantially diametrically opposite said reference index over a predetermined portion of said dial in opposing directions, band guide means formed in said dial face at said initial points each being adapted to guide the leading edge of the cooperating one of said transversely extending band members from behind the viewed side of said dial into viewable juxtaposition with said indices upon a predetermined direction of rotation of the associated drum member being effected.

9. Indicating means as defined in claim 8 wherein said indicator comprises a rate of climb meter including a zero reference index and a scale extending in either direction from said zero index to represent respective rates of climb and descent, said movable indicating member being positioned in accordance with an experienced vertical speed input parameter to indicate the instantaneous vertical speed performance, said first and second optical stimuli comprising visual bands caused to appear on the indicator face at that point on said indicator face defining a maximum rate of climb and rate of descent respectively and extending in annunciating cooperation with said meter indexes over predetermined controllable segments of said indices in mutually opposite directions, wherein that portion of said scale with which said first and second bands are juxtaposed and that portion of said scale with which neither of said first and second bands is juxtaposed defined distinct first and second indicator command segments as concerns vertical speed performance.

10. An indicator as defined in claim 9 wherein each of said bands is caused to be extensible in visible length from the extreme index reading towards said zero reference index and beyond said zero reference index by a predetermined length.

11. An indicator as defined in claim 10 wherein each of said first and second bands are controllable in observed length by input signals developed in a collision avoidance computer, whereby operational performance resulting in said indicator needle being positioned on said scale to portions thereof exclusive of those with which said bands are juxtaposed, defines a command vertical speed indication to obviate collision with aircraft on a converging flight path.

12. An indicator as defined in claim 1 wherein said indicator comprises a rate of climb meter including a zero reference index and a scale extending in either direction from said zero index to represent respective rates of climb and descent, said first and second controlled optical stimuli being responsive to vertical speed command signals emanating from a collision avoidance computer means, and a third controlled optical stimuli adapted to be selectively observable in response to turn command signals emanating from said collision avoidance computer.

* * * * *